United States Patent Office 3,704,179
Patented Nov. 28, 1972

3,704,179
PROCESS FOR IMPROVING THERMO RESPONSE CHARACTERISTICS OF THERMOSTAT METAL ELEMENTS
Henry Ty and Joseph Luerken, Attleboro, Mass., assignors to Texas Instruments Incorporated, Dallas, Tex.
No Drawing. Filed Aug. 3, 1970, Ser. No. 60,635
Int. Cl. C23c 1/10; C23f 7/04
U.S. Cl. 148—6.17                                  4 Claims

ABSTRACT OF THE DISCLOSURE

A process for improving the heat-absorbing properties of thermostat metal elements is shown to include controlled tumbling of the elements with selected abrasives followed by controlled etching of the elements with selected etchants for increasing and blackening the surface areas of the elements in a uniform and reproducible manner without deleteriously altering other properties of the elements.

---

Thermostatic, bimetallic elements embodying bonded layers of metals of different coefficients of thermal expansion are widely used in circuit breakers, relays and the like to detect the occurrence of selected changes in temperature. In these applications, the thermostatic elements are disposed in the zone in which the noted temperature changes are to occur. As the temperature changes occur in this zone, the temperatures of the thermostatic elements also change so that some flexing movement of the elements will take place to actuate a signal device or to otherwise indicate the occurrence of the temperature change. In these arrangements it is desirable to employ thermostatic elements which are capable of absorbing heat very rapidly to minimize the delay between the occurrence of selected temperatures in the temperature zones and the heating of the thermostatic elements to the selected temperatures. In this regard, it should be understood that thermostatic metal elements are customarily formed in roll bonding processes which provide such elements with smoothly polished surfaces. The natural color of metal materials used in thermostatic elements also tends to be relatively light so that the elements have relatively poor heat-absorbing properties.

In dealing with thermostatic elements of the character above described, it should also be noted that, if the elements are to be mass produced at suitably low cost, all of the manufacturing steps employed in producing the elements must be very carefully controlled so that the elements produced in a particular process can be used interchangeably. For example, any process employed in producing thermostatic elements is desirably regulated to assure that the materials in all of the elements are subjected to the same temperatures and pressures during element manufacture to provide exactly the same stresses in each of the elements, whereby, when the elements are mounted in circuit breakers and the like, each of the elements will display substantially the same thermal response characteristics. For ease in mounting the thermostatic elements in various devices, it is also desirable that the elements be easily welded to elements supports and the like.

It is an object of this invention to provide a novel and advantageous process for improving the heat-absorbing properties of the thermostat metal elements; to provide such a process which increases and blackens the surface areas of such elements for increasing the heat-absorbing properties thereof; to provide such a process which is readily controlled to improve the heat-absorbing properties of thermostat metal elements in a uniform and reproducible manner; to provide such a process which accomplishes improvement of the heat-absorbing properties of the elements without deleteriously altering other properties of the elements; to provide such a process to provide thermostat metal elements which have excellent heat-absorbing properties and which are readily welded; and to provide such a process which is easily and economically performed.

In accordance with the method of this invention, the heat-absorbing properties of thermostatic metal elements are improved in a uniform and reproducible manner by tumbling the elements, preferably with a suitable abrasive medium, to increase the surface areas of the elements and by chemically treating the element surfaces with a selected etchant to blacken the element surfaces. Various thermostatic metal elements are adapted to be treated in this way including multilayered metal thermostatic materials having one or more layers thereof formed of a metal or alloy selected from the groups of metals and alloys set forth in Tables I and II.

TABLE I

| Alloy | Nickel | Chromium | Iron | Manganese | Aluminum | Molybdenum | Cobalt | Carbon |
|---|---|---|---|---|---|---|---|---|
| B | 22.0 | 3.0 | Balance | | | | | 0.5 |
| C | 19.4 | 2.25 | do | | | | | |
| D | 14.65 | | do | 9.5 | 5.1 | | | |
| E | 25.0 | 8.5 | do | | | | | |
| G | 18.0 | 11.5 | do | | | | | |
| GA | 18.0 | 10.0 | do | | | | 3.0 | |
| GB | 19.0 | 7.0 | do | | | | | |
| H | 14.0 | | do | 5.0 | | | | 0.5 |
| K | | | do | | | | | |
| L | 25.0 | | do | 4.0 | | | | |
| M | 8.0 | 18.0 | do | | | | | |
| 15 | 32.0 | | do | | | 1.0 | 1.0 | |
| 71 | | 16.5 | do | | 4.5 | | | |
| 10 | 36.0 | | do | | | | | |
| 11 | 38.65 | | do | | | | | |
| 12 | 31.0 | 8.0 | do | | | | 8.0 | |
| 13 | 32.0 | | do | | | 1.0 | 15.0 | |
| 14 | 38.0 | 7.0 | do | | | | | |
| 15 | 32.0 | | do | | | 1.0 | 1.0 | |
| 20 | 40.0 | | do | | | | | |
| 30 | 42.0 | | do | | | | | |
| 40 | 45.0 | | do | | | | | |
| 50 | 50.0 | | do | | | | | |
| 70 | | 17.0 | do | | | | | |

In accordance with conventional procedure, the alloys set forth in this table may also include small quantities of additional constituents present as impurities in the alloys.

TABLE II

| Alloy | Nickel | Manganese | Iron | Copper | Cobalt | Chromium |
|---|---|---|---|---|---|---|
| LA | 20.0 | 6.0 | Balance | | | |
| P | 10.0 | 72.0 | | 18.0 | | |
| PA | 15.0 | 75.0 | | 10.0 | | |
| 80 | | | Balance | | 57.0 | 9.0 |

In accordance with conventional procedure, the alloys set forth in this table may also include small quantities of additional constituents present as impurities in the alloys.

As will be understood, the tumbling of thermostatic metal elements required in the process of this invention is performed in any conventional tumbling apparatus where a large number of the elements on the order of several hundred to several thousand elements are tumbled together in a barrel at room temperature or slightly above room temperature for a period from about one half hour to about eight hours. Preferably, the elements are placed in the tumbling apparatus along with a suitable silicon carbide, corundum or other hard, particulate abrasion material having particle sizes between about .005 and .050 inch. Preferably also, a suitable solvent or cleaning agent such as trisodium phosphate, preferably added in granular form, is combined with the thermostatic metal elements and abrasive particles in the tumbling apparatus. In this tumbling procedure the thermostatic element surfaces are provided with a matte finish which, in effect, significantly increases the total surface area of the elements.

After tumbling of the thermostatic elements in this manner, the elements are subjected to a cold water rinse and to a hot water rinse at a temperature on the order of 180° F. for removing cleaning solvent, abrasive materials and other extraneous matter from the element surfaces. Then, preferably but not necessarily after fully drying the elements, the thermostatic elements are introduced into a selected etchant for a brief period of time for blackening the element surfaces. While various etchants can be used for providing the thermostatic elements with coatings of various dark metallic compounds thereon, a preferred etchant used for this purpose combines hydrochloric, nitric and sulphuric acid with copper sulfate and selenium dioxide in water, the resulting etchant serving to provide the element surfaces with a very dense, uniform black color. For example, in a preferred etchant formulation according to this invention, 150 grams of 12 M nitric acid in about 700 grams of water is combined with about 150 grams of selenium dioxide and 90 grams of copper sulfate, stirring of the combined ingredients being continued until all constituents are fully dissolved. After adding of about 700 grams of 12 M hydrochloric acid and about 300 grams of 12 M sulfuric acid, sufficient water is added to provide approximately 3 liters of the etchant solution. In this etchant solution, the various ingredients have the following concentrations by weight:

| | Percent |
|---|---|
| Selenium dioxide | 5 |
| Copper sulfate | 3 |
| Nitric acid | 3.8 |
| Hydrochloric acid | 10 |
| Sulfuric acid | 5.9 |

In utilizing the selected etchant, it will be understood that the etchant is preferably used in sufficiently dilute form to permit immersion of thermostatic elements in the etchant for a convenient period of time without excessively etching the elements. For example, where the above-described etchant solutions were used at full strength, conventionally sized thermostatic elements would be adequately etched within a brief period and additional dwell time of the elements in the etchant solution would result in unnecessary etching of the elements and unnecessary depletion of the solution strength. Accordingly, in the preferred process of this invention, the above-described etchant is diluted with water in a ratio from one part of the etchant solution and one part water to about one part of the etchant solution and about 20 parts of water. With a 1:1 dilution ratio, the thermostatic elements are preferably etched for about 10 seconds in the described solution whereas with a 20:1 dilution ratio, the elements are preferably etched for approximately 60 seconds.

Following etching of the thermostatic elements in the manner above-described, the elements are preferably rinsed first in cold water and then in hot water and are then dried by spinning the elements in a spinning apparatus while being subjected to a stream of steam for about 10 seconds to one minute. Finally, for completing drying and removal of all moisture from the element surfaces, the elements are preferably tumbled with corn cob particles or other highly moisture-absorbent material for several minutes. Following this etchant treatment, the thermostatic elements are found to have a very dark, uniform, black color which significantly improves the heat-absorbing properties of the thermostatic elements.

For example, in improving the heat-absorbing properties of selected thermostatic metal elements in accordance with this invention, approximately 300 thermostatic metal elements were tumbled together in a 20 gallon barrel of a conventional tumbling apparatus, each of the elements comprising a strip of bimetallic material approximately 0.625 inch wide, 2.00 inches long and 0.030 inch thick and having a U-shape in which the legs of the U-shape were spaced approximately 0.50 inch apart. The bimetallic strip material of the elements embodied equal thicknesses of Alloy B and Alloy 10 materials as previously described in Table I. The elements were tumbled at room temperature for five hours together with approximately 3 pounds of particulate, silicon carbide, abrasive material having a substantially uniform distribution of particle sizes ranging from 0.005 to 0.050 inch and with approximately 7 ounces of granulated cleaning solvent composed of about 75% by weight trisodium phosphate and the balance sodium carbonate. At the end of this tumbling period, the elements were rinsed first in hot water at about 180° F. and then in water at room temperature. After substantially fully drying the elements, the elements were then immersed for 10 seconds in the preferred etchant formulation above described, the etchant being used in dilution of one part of the etchant formulation to one part of water. Upon removal of the elements from the etchant, the elements were first rinsed in hot water at 180° F. and then in water at room temperature. The elements were then dried in a spinning apparatus for about one minute while being subjected to a drying steam treatment which did not raise the element temperature above about 150° F. Finally, the elements were tumbled with corn cob particles for several minutes for completely drying the elements.

Following this treatment, the elements were found to display a substantially uniform matte finish which represented a significant increase in the surface area of the elements, the elements also displaying a uniform, dense, black color. Upon testing of the elements, the elements were found to display substantially the same, uniform, thermal response characteristics as the elements had displayed prior to treatment, thereby indicating that the abrasive and other steps of the treatment had not deleteriously altered the thermal properties of the elements. However, the elements displayed a substantially uniform thermal emissivity which was about 15% greater after the described treatment than the elements had displayed prior to treatment, thereby indicating that the heat-absorbing properties of the elements had been substantially improved by the treatment. As will be understood, the increase in surface area of the elements resulting from provision of the noted matte finish contributed to some extent to the improvement in the heat absorbing properties of the elements whereas the more advantageous dark color of the elements also contributed to the improvement in the heat-absorbing properties of the elements. In this regard, it is believed that the described abrasive treatment is sufficiently thorough so that each of the elements treated was provided with substantially the same degree of increase in surface area. Similarly, treatment of the thermostatic metal elements with the described etchant, a strongly oxidizing bath embodying a copper material, is believed to result in reaction with the wide variety of metal materials conventionally used in thermostatic metal elements to produce various dark compounds of copper and the like to achieve a uniform, dense, black color on the thermostatic elements. In this way, the process of this invention is adapted for use with batches of identically prepared thermostatic elements to provide a substantially uniform improvement in the heat-absorbing properties of the elements, whereby the process is adapted for use in producing thermostatic elements suitable for substantially interchangeable use in thermostatic devices. It was also found that the dark matte finish found in the elements did not interfere with welding of the elements and that the elements were adapted to be welded as easily afer treatment as before treatment in the process of this invention.

It will be understood that various modifications of the dscribed embodiments of the process of this invention can be utilized within the scope of this invention and that this invention includes all modifications and equivalents of said described process falling within the scope of the appended claims.

We claim:

1. A process for making thermostatic metal elements having improved heat-absorbing properties comprising the steps of tumbling a plurality of thermostatic metal elements together with a particulate abrasive material having particle sizes in the range from 0.005 to 0.050 inch and with an aqueous mixture of a sodium phosphate and a sodium carbonate for providing said elements with a matte finish to uniformly increase the surface area of said elements, and immersing said elements for a selected period of time in an oxidizing bath for darkening the surfaces of said elements, said oxidizing bath comprising an aqueous solution of selenium dioxide, copper sulfate, nitric acid, sulphuric acid and hydrochloric acid.

2. A process for making thermostatic metal elements having improved heat-absorbing properties comprising the steps of tumbling a plurality of thermostatic metal elements together with a particulate abrasive material having particle sizes in the range from 0.005 to 0.050 inch and with an aqueous mixture of a sodium phosphate and a sodium carbonate for providing said elements with a matte finish to uniformly increase the surface area of said elements, and immersing said elements for a selected period of time in an oxidizing bath for darkening the surfaces of said elements, said oxidizing bath comprising an aqueous solution of, by weight, 5% selenium dioxide, 3% copper sulfate, 3.8% nitric acid, 10% hydrochloric acid, and 5.9% sulphuric acid, each part of said solution being diluted with from one to twenty parts water.

3. A process for making thermostatic metal elements having improved heat-absorbing properties comprising the steps of tumbling a plurality of thermostatic metal elements together with a particulate abrasive material having particle sizes in the range from 0.005 to 0.050 inch and with an aqueous mixture of a sodium phosphate and a sodium carbonate for providing said elements with a matte finish to uniformly increase the surface area of said elements, and immersing said elements for a selected period of time in an oxidizing bath for darkening the surfaces of said elements, said thermostatic metal elements embodying materials selected from Tables I and II.

4. A process for making thermostatic metal elements having improved heat-absorbing properties comprising the steps of providing a plurality of substantially identical thermostatic elements embodying metal materials selected from Tables I and II, tumbling said thermostatic elements for from one-half to eight hours together with a silicon carbide particulate material having particle sizes in the range from 0.005 to 0.050 inch and with a granulated cleaning material embodying approximately 75% trisodium phosphate and 25% sodium carbonate for providing said elements with a matte finish to uniformly increase the surface area of said elements, rinsing said elements in water for removing loose, extraneous material from the surfaces thereof, immersing said thermostatic elements for from 10 to 60 seconds in an oxidizing bath embodying an aqueous solution of, by weight, 5% selenium dioxide, 3% copper sulfate, 3.8% nitric acid, 10% hydrochloric acid and 5.9% sulphuric acid where each part of said solution is diluted with from one to twenty parts of water, rinsing said thermostatic elements with water for removing said solution from the surfaces of said thermostatic elements, spinning said thermostatic elements while directing steam thereon for drying said elements, and tumbling said elements with moisture-absorbent material for completing drying of said elements.

References Cited
UNITED STATES PATENTS

| | | | |
|---|---|---|---|
| 2,404,295 | 7/1946 | Klinger | 148—6.17 X |
| 3,535,159 | 10/1970 | Shiro | 134—1 |

JACOB STEINBERG, Primary Examiner

U.S. Cl. X.R.

156—6; 134—1, 7; 51—313